US012591337B2

(12) United States Patent　　　　　(10) Patent No.:　US 12,591,337 B2
Pundak et al.　　　　　　　　　　　　　(45) Date of Patent:　　Mar. 31, 2026

(54) AGGREGATED LIKELIHOOD OF UNINTENTIONAL TOUCH INPUT

(71) Applicant: Microsoft Technology Licensing, LLC, Redmond, WA (US)

(72) Inventors: Gilad Pundak, Rehovot (IL); Hanan Grinberg, Ramat-Gan (IL); Eran Arbel, Netanya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/854,702

(22) PCT Filed: Apr. 20, 2023

(86) PCT No.: PCT/US2023/019201
§ 371 (c)(1),
(2) Date: Oct. 7, 2024

(87) PCT Pub. No.: WO2023/215114
PCT Pub. Date: Nov. 9, 2023

(65) Prior Publication Data

US 2025/0231644 A1　　Jul. 17, 2025

(30) Foreign Application Priority Data

May 6, 2022　(NL) ..................................... 2031789

(51) Int. Cl.
*G06F 3/041*　　　　(2006.01)
*G06F 3/01*　　　　(2006.01)
(Continued)

(52) U.S. Cl.
CPC .......... *G06F 3/04186* (2019.05); *G06F 3/011* (2013.01); *G06F 3/03545* (2013.01); *G06F 3/0442* (2019.05); *G06F 1/1686* (2013.01)

(58) Field of Classification Search
CPC .... G06F 3/04186; G06F 3/0442; G06F 3/011; G06F 3/03545; G06F 1/1686
See application file for complete search history.

(56) References Cited

U.S. PATENT DOCUMENTS 8,294,686 B2　10/2012　Townsend
8,502,787 B2　　8/2013　Rigazio
(Continued)

FOREIGN PATENT DOCUMENTS

EP　　　　3167352 A1　　5/2017

OTHER PUBLICATIONS

International Search Report and Written Opinion received for PCT Application No. PCT/US23/019201, Jul. 10, 2023, 16 pages.
(Continued)

*Primary Examiner* — Afroza Chowdhury
(74) *Attorney, Agent, or Firm* — Alleman Hall LLP

(57) ABSTRACT

A method is presented for processing input at a touch-sensitive display device. A touch input to the touch-sensitive display device is recognized. Based at least on a first set of features extracted from the recognized touch input, a first likelihood that the recognized touch input is unintentional is determined and compared to a first confidence threshold. Responsive to the first likelihood being less than the first confidence threshold, a second likelihood that the recognized touch input is unintentional is determined. The second likelihood is based on at least a second set of features extracted from outputs of one or more additional sensors. An aggregate likelihood that the recognized touch input is unintentional is then determined based on at least the first likelihood, the first set of features, and the second likelihood. Responsive to the aggregate likelihood being greater than a second confidence threshold, the touch input is arrested.

20 Claims, 6 Drawing Sheets

(51) Int. Cl.

| | |
|---|---|
| *G06F 3/0354* | (2013.01) |
| *G06F 3/044* | (2006.01) |
| *G06F 1/16* | (2006.01) |

(56) References Cited

U.S. PATENT DOCUMENTS

| | | | |
|---|---|---|---|
| 9,626,020 B2 | 4/2017 | Durojaiye | |
| 10,216,330 B2 | 2/2019 | Vavra | |
| 10,852,814 B1* | 12/2020 | Caron | G06T 19/006 |
| 2012/0154293 A1 | 6/2012 | Hinckley et al. | |
| 2014/0368436 A1 | 12/2014 | Abzarian et al. | |
| 2016/0062533 A1 | 3/2016 | O'Connor | |
| 2016/0077650 A1* | 3/2016 | Durojaiye | G06F 3/0418 |
| | | | 345/173 |
| 2016/0328112 A1 | 11/2016 | Jiang | |
| 2017/0300170 A1 | 10/2017 | Hinckley et al. | |
| 2018/0157371 A1 | 6/2018 | Harrison et al. | |
| 2019/0286217 A1 | 9/2019 | Da Veiga | |
| 2019/0295282 A1 | 9/2019 | Smolyanskiy et al. | |
| 2021/0120315 A1* | 4/2021 | Makinen | H04N 21/6437 |
| 2022/0253148 A1* | 8/2022 | Sorgi | G06F 3/017 |

OTHER PUBLICATIONS

Matero, et al., "Identifying unintentional touches on handheld touch screen devices", DIS '12: Proceedings of the Designing Interactive Systems Conference, Jun. 11, 2012, pp. 506-509.

Search Report and Written Opinion Issued in Netherland Application No. NL2031789, Mailed on Dec. 22, 2022, 12 Pages.

Shen, et al., "FarOut Touch: Extending the Range of ad hoc Touch Sensing with Depth Cameras", SUI '21: Proceedings of the 2021 ACM Symposium on Spatial User Interaction, Nov. 9, 2021, pp. 1-12.

Zoltan Egyed, "Suppression of Unintentional Touch Inputs Caused by Moving Content on a Display", Technical Disclosure Commons, Feb. 19, 2021, 9 pages.

* cited by examiner

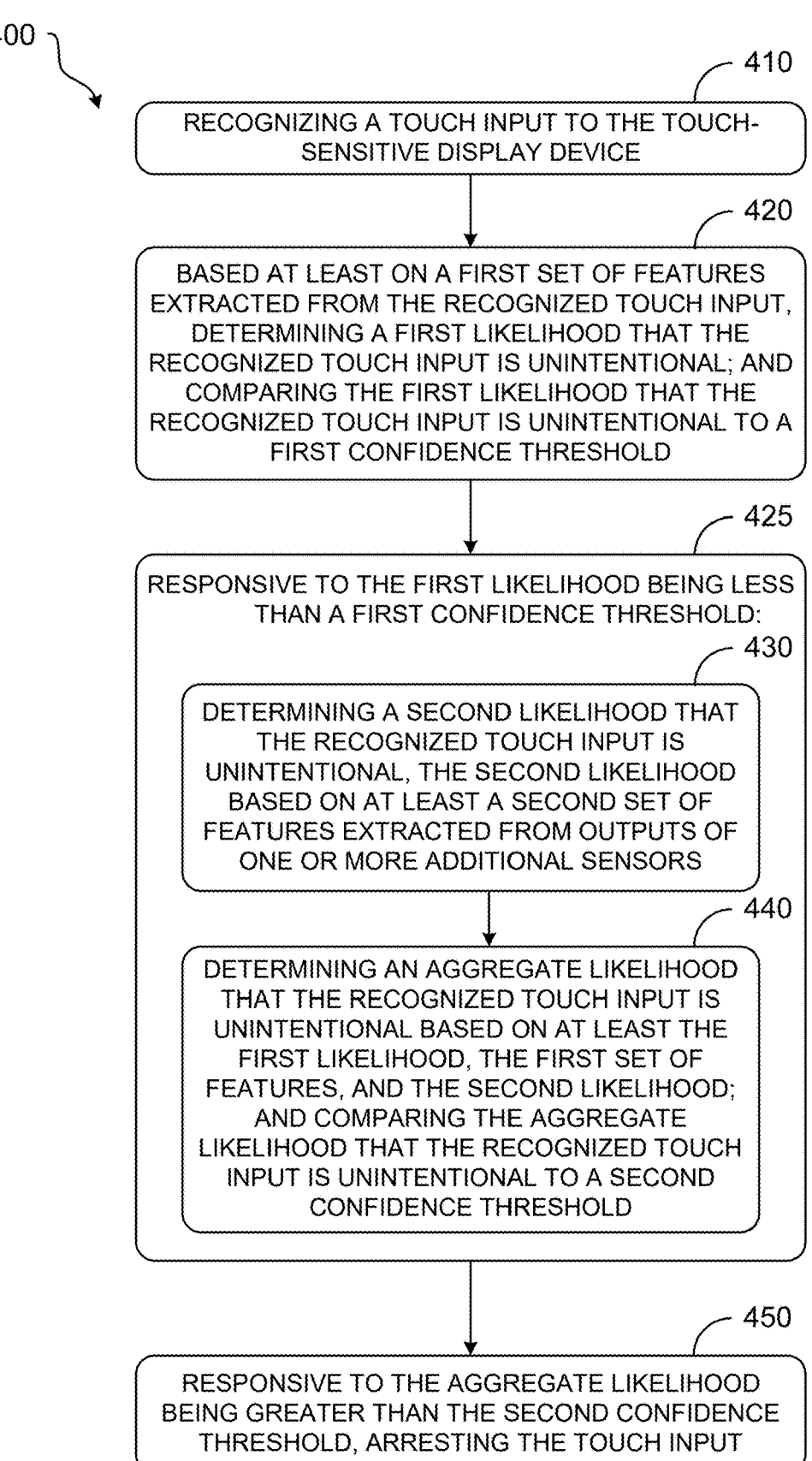

400

410

RECOGNIZING A TOUCH INPUT TO THE TOUCH-SENSITIVE DISPLAY DEVICE

420

BASED AT LEAST ON A FIRST SET OF FEATURES EXTRACTED FROM THE RECOGNIZED TOUCH INPUT, DETERMINING A FIRST LIKELIHOOD THAT THE RECOGNIZED TOUCH INPUT IS UNINTENTIONAL; AND COMPARING THE FIRST LIKELIHOOD THAT THE RECOGNIZED TOUCH INPUT IS UNINTENTIONAL TO A FIRST CONFIDENCE THRESHOLD

425

RESPONSIVE TO THE FIRST LIKELIHOOD BEING LESS THAN A FIRST CONFIDENCE THRESHOLD:

430

DETERMINING A SECOND LIKELIHOOD THAT THE RECOGNIZED TOUCH INPUT IS UNINTENTIONAL, THE SECOND LIKELIHOOD BASED ON AT LEAST A SECOND SET OF FEATURES EXTRACTED FROM OUTPUTS OF ONE OR MORE ADDITIONAL SENSORS

440

DETERMINING AN AGGREGATE LIKELIHOOD THAT THE RECOGNIZED TOUCH INPUT IS UNINTENTIONAL BASED ON AT LEAST THE FIRST LIKELIHOOD, THE FIRST SET OF FEATURES, AND THE SECOND LIKELIHOOD; AND COMPARING THE AGGREGATE LIKELIHOOD THAT THE RECOGNIZED TOUCH INPUT IS UNINTENTIONAL TO A SECOND CONFIDENCE THRESHOLD

450

RESPONSIVE TO THE AGGREGATE LIKELIHOOD BEING GREATER THAN THE SECOND CONFIDENCE THRESHOLD, ARRESTING THE TOUCH INPUT

FIG. 4

AGGREGATED LIKELIHOOD OF UNINTENTIONAL TOUCH INPUT

CROSS REFERENCE TO RELATED APPLICATIONS

The present application is a U.S. National Phase of International Patent Application Serial No. PCT/US2023/019201 entitled "AGGREGATED LIKELIHOOD OF UNINTENTIONAL TOUCH INPUT", filed Apr. 20, 2023, which claims priority to Netherlands Patent Application Serial No. 2031789, filed May 6, 2022, the entire contents of each of which are hereby incorporated by reference for all purposes.

BACKGROUND

Touch-sensitive display devices are ubiquitous in daily life, allowing for intuitive, natural input with seemingly limitless options. Capacitive touch sensors allow for a user to provide input using only a finger (or multiple fingers). Many devices also accept input from digital styli, allowing for finer control and detailed inputs akin to writing with a pen. Such touch input may allow for direct manipulation and interaction with objects displayed on the touch-sensitive display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method is presented for processing input at a touch-sensitive display device. A touch input to the touch-sensitive display device is recognized. Based at least on a first set of features extracted from the recognized touch input, a first likelihood that the recognized touch input is unintentional is determined and compared to a first confidence threshold. Responsive to the first likelihood being less than the first confidence threshold, a second likelihood that the recognized touch input is unintentional is determined. The second likelihood is based on at least a second set of features extracted from outputs of one or more additional sensors. An aggregate likelihood that the recognized touch input is unintentional is then determined based on at least the first likelihood, the first set of features, and the second likelihood. Responsive to the aggregate likelihood being greater than a second confidence threshold, the touch input is arrested.

BRIEF DESCRIPTION OF THE DRAWINGS

FIG. 4 is a flow diagram for an example method of processing input at a touch-sensitive display device.

DETAILED DESCRIPTION

Figure 1B:
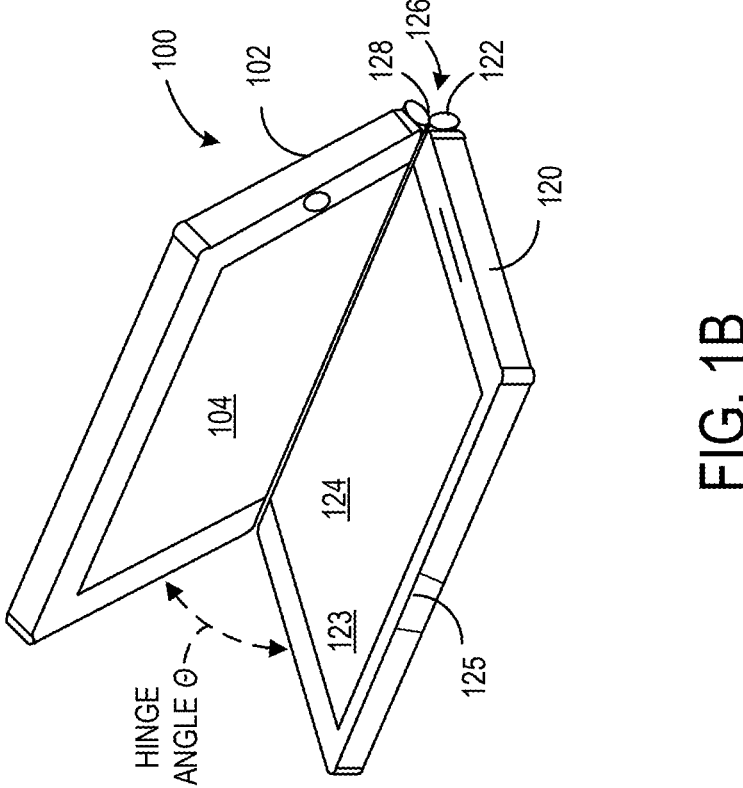
FIG. 1B shows the touch-sensitive display device of FIG. 1A coupled to a second leaf.

This detailed description relates to processing touch-sensitive display input in order to estimate whether a received input, be it from a body part or a mechanical input device, is intentional input or unintentional input. Users can become frustrated when the intent of their input is not matched by the output of their device. Users can also provide input unintentionally, particularly through accidental touching of a capacitive sensor. Setting a balance between false positives generated through sensitive detection settings and false negatives generated through less responsive settings thus presents challenges.

Often the validity of a touch input is not inherently apparent from the data generated by the touch sensor itself. In such a scenario, processing an unintended touch as a valid touch can result in unintended input which may cause the device to errantly upload information, delete files, change configurations or preferences, make purchases, initiate communication channels, etc. A series of unintended touches could be recognized as a sequence of inputs, leaving the user unable to discern what happened or how to reverse course. Conversely, if the threshold for an intended touch is high enough to block most unintended touches, many valid touches may also be rejected, leaving the user frustrated at having to repeat input actions.

Blocking unintended touch is thus a key capability of a touch controller for a touch-sensitive display device. Most existing devices rely on simple touch classification based on data received from the touch sensors. Often, information derived from such touch sensors may be sufficient to discern a valid touch. However, there are numerous scenarios where this validity cannot be classified without additional context. As such, some devices utilize fusion techniques with touch and stylus metadata and/or near-field communications, while others utilize motion data for the device. In such scenarios, all of the input data funnels into a single decision point. As the touch controller is often programmed into the firmware of the device, any changes to the classification algorithm, improvements from model training, or support for peripheral sensors must be bundled into a significant firmware upgrade.

Systems and methods are described herein that provide a robust two-stage approach to discerning unintentional touch. Initially, a received touch input is processed to estimate whether it is likely to be unintentional touch input using characteristics extracted from the associated touch sensors and/or heat map(s) (i.e., a matrix indicating relative sensor measurements at different locations (e.g., corresponding to capacitive grid)). If the touch input itself can be classified as unintentional with high certainty, it may be blocked without further analysis. If it is estimated that the likelihood of an unintentional touch input is less than a threshold, additional analysis of input received from other sensors is performed to help discern intentionality. Such additional analysis may include processing of input received from sensors included in the input device (e.g., an accelerometer, magnetometer, and gyroscope for determining movement of the input device). Images captured by a device camera may also be processed to determine the relative positioning, orientation, and movement of the device and/or user leading up to the ambiguous touch input. The touch input and initial likelihood are then reevaluated in light of the likelihood based on the sensor data to determine whether the touch input should be blocked or passed on for further processing.

Such an approach allows for higher confidence input sorting while allowing obviously unintentional touches to exit from further analysis at the first stage. The sensor data may be processed and handled by a hand posture detector, the pre-processing and hand posture detection utilizing one or more processes outside the firmware of the device. In this way, upgrades to the second stage of the analysis may be implemented through relatively minor patching. No additional or feature specific hardware is necessary to apply this methodology. The implementation and integration costs can thus be kept low, at the software level. Sensor data that is already being generated can be cached and analyzed. As such, there is a negligible impact on power consumption.

Figure 1A:
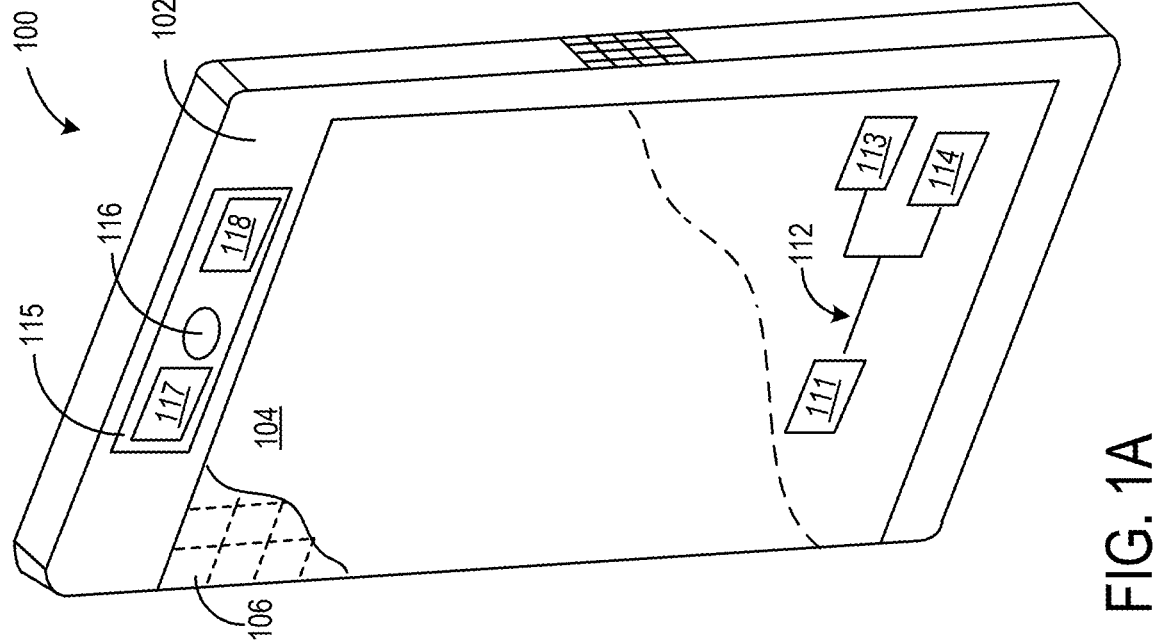
FIG. 1A shows an example touch-sensitive display device.

To address the above described issues, as shown in FIGS. 1A-1B, a computing device 100 in accordance with one example embodiment of the present disclosure is disclosed. Computing device 100 comprises a touch-sensitive display 102 having a display surface 104 and a capacitive touch sensor 106.

Display surface 104 is configured to display images. While capacitive touch sensor 106 is illustrated in a capacitive grid configuration, it will be appreciated that other types of touch sensors and configurations may also be used, such as, for example, a capacitive diamond configuration. The capacitive touch sensors are typically at least partially transparent, being manufactured, for example, of indium tin oxide (ITO). Capacitive touch sensor 106 is configured to detect a touch input resulting from objects on or near touch-sensitive display 102, such as a user's finger, hand, stylus, etc. Such a touch input may result in a change in capacitance between driven electrodes and read electrodes in the grid while using mutual capacitance and/or by reading the capacitance change of every electrode to itself by using self-capacitance. However, touch sensing technologies that do not utilize capacitance are also compatible with this disclosure.

Computing device 100 may include one or more processors 111, which may be connected via a bus 112 to a volatile memory 113 and non-volatile memory 114. Aspects of these components are described further herein and with regard to FIGS. 2, 5, and 6.

Sensor suite 115 may include one or more cameras 116, such as depth cameras, infrared cameras, ultraviolet light cameras, and/or visible light (RGB) cameras. Cameras 116 may optionally be coupled to facial recognition and/or eye-tracking software. The RGB camera may be operated in one or more modes, such as an active mode and an always-on mode. In an active mode, an RGB and/or infrared (IR) camera may be selected by the user, either directly or through a selected application preference, to operate with a relatively high resolution and relatively high frame rate (e.g., 30 fps). For example, active mode may be selected for video conferencing applications, to use facial recognition for security purposes, etc. In always-on mode, an RGB and/or IR camera may operate at a relatively low resolution and relatively low frame rate (e.g., 3-5 fps). In such an always-on mode, the output of an RGB and/or IR camera may be used to extract basic information about the environment, such as the presence/absence of a user, while conserving power and/or processing resources. The presence or absence of a user may be used to trigger powering the touch-sensitive display on or off, respectively, for adaptive screen dimming, etc. Privacy constraints may be met by using the low-resolution images, and by routing the received imagery to a side-process.

One or more inertial measurement units (IMUs) 117 may be provided within sensor suite 115. Each IMU 117 may comprise one or more accelerometers, gyroscopes, and/or magnetometers, that when combined, can indicate whether the device is static, or if it is dynamically moving, and to what degree. Each IMU 117 may be configured to produce a respective six degree of freedom (6DOF) vector indicating its relative acceleration around three axes including a vertical axis that points toward the earth, as well as pitch, yaw, and roll. The output of IMU 117 may be used to discern the general device orientation, such as flat on a table, propped up on a kickstand, or being carried in a portrait or landscape pose. The technical benefits of employing IMUs 117 within sensor suite 115 include collecting device-specific information that may be used to infer how the device is being used at any given time. As IMUs are employed for many purposes in the device, no additional sensor is needed to collect this information.

Sensor suite 115 may further include one or more device posture sensors 118. Device posture sensors 118 may include hall effect sensors, proximity sensors, hinge angle sensors, status of detachable companion device sensors, wireless signal level sensors, etc. Data generated by these sensors may be cached, pre-processed, with features extracted from the data. Features from hall effect sensors may be indicative of device posture such as whether the device is in a flat or angled position, a landscape mode or portrait mode, etc. Sensor suite 115 may further include one or more of compasses, temperature sensors, edge floating capacitance and/or resistance sensors, peripheral squeeze sensors, and/or other suitable sensors.

As shown in FIG. 1B, in some examples, touch-sensitive display 102 may function as a first leaf of a two-leafed device that may adopt numerous conformations. Touch-sensitive display 102 may be permanently or detachably coupled to a second leaf 120. Second leaf 120 may be coupled to touch-sensitive display 102 by a hinge 122. Touch-sensitive display 102 and second leaf 120 may be rotatably coupled via a hinge 122, that may be positioned at various hinge angles θ, allowing for relative rotational movement of touch-sensitive display 102 and second leaf 120. Touch-sensitive display 102 and second leaf 120 may be separated by the hinge angle. The hinge angle is defined as an angle between the display surface 104 and the input-side surface of second leaf 120. In the illustrated example, hinge 122 is rotatable such that the hinge angle may have any value between ~0° and ~360°.

Second leaf 120 may be a touch display, a non-touch display, a keyboard, a trackpad, a gaming input interface, or other suitable component for displaying information, receiving user input, or otherwise interacting with touch-sensitive display 102 and/or providing other computing functionality. Second leaf 120 may include input mechanisms 123 (e.g., capacitive touch input, keyboards, microphones, joysticks)-output mechanisms 124 (e.g., display devices, haptic motors, audio speakers) and one or more sensors 125, including, but not limited to, the sensors described with regard to sensor suite 115.

In examples, where touch-sensitive display 102 and second leaf 120 are reversibly detachable, sensor suite 115 may further include one or more connectivity sensors 126, configured to provide a signal indicating whether touch-sensitive display 102 and second leaf 120, and in some examples, may provide characteristics of second leaf 120. For example, connectivity sensors 126 may generate a signal when touch-sensitive display 102 and second leaf 120 are connected and may not generate a signal when touch-sensitive display 102 and second leaf 120 are detached. When connected, other information, such as from sensors of the detachable device, may be communicated to the touch-sensitive display device.

In examples, where touch-sensitive display 102 is configured to couple with a second leaf 120, sensor suite 115 may further include one or more hinge angle sensors 128 to detect the hinge angle between display surface 104 and an input surface of second leaf 120. As a nonlimiting example, the hinge angle sensor 128 may be a potentiometer (or variable resistor) positioned in the hinge 122 and configured to measure the angle of the hinge 122. In the illustrated embodiment, hinge 122 is a double hinge and a hinge angle sensor 128 is provided in each hinge. By reading the measured value of each hinge angle sensor 128, a total value for the hinge angle θ may be computed. Alternatively, a single hinge with a single potentiometer may be utilized.

In addition to or as an alternative to the one or more hinge angle sensors 128, a hinge angle θ may be computed based on 6DOF vectors generated by IMUs 117. Additionally or alternatively, other types of accelerometers or gyroscopes could be utilized to obtain similar measurements and compute the hinge angle. As yet another alternative, in addition or alternatively to the hinge angle sensor 128 and IMUs 117, image data from camera 116 may be analyzed to measure or infer a depth to the second leaf 120 for values less than 90 degrees, for example. As non-limiting examples, machine learning models may be trained to approximate a distance based on labeled images, or by recognizing characteristics of a fiducial marker on a face of second leaf 120. In some examples, camera 116 may include a depth camera. In these and/or other poses and postures, such a depth camera may be used to determine a distance to a nearest surface other than a touch display, for example to a user.

Figure 2:
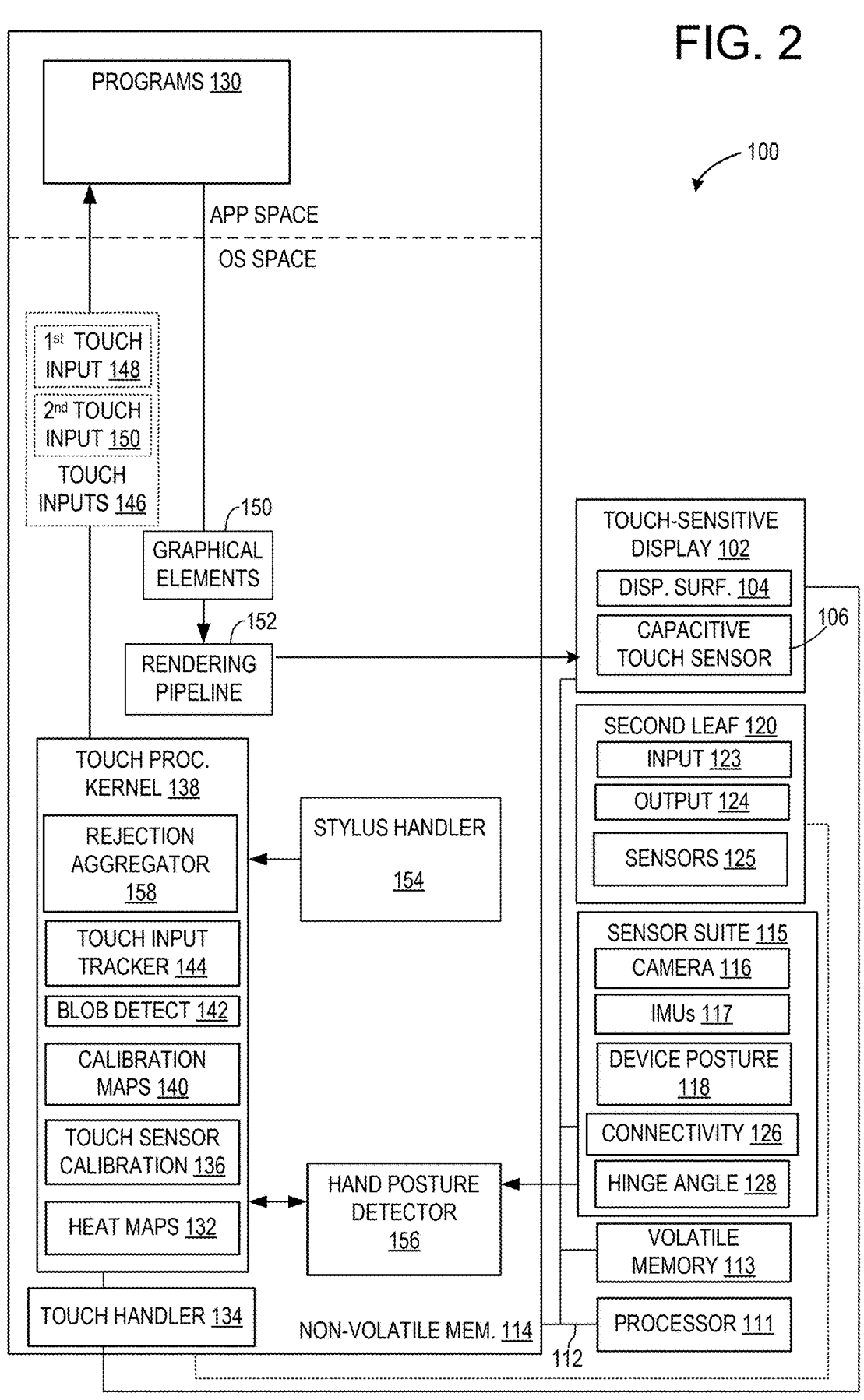
FIG. 2 is a schematic view illustrating software and hardware components of the computing device of FIGS. 1A and 1B.

Turning to FIG. 2, a nonlimiting software and hardware architecture of computing device 100 is illustrated in schematic view. As described with regard to FIG. 1A, computing device 100 includes one or more processors 111, illustrated here as being connected via a bus 112 to a volatile memory 113, a non-volatile memory 114, sensor suite 115, and touch-sensitive display 102. Programs 130 stored in non-volatile memory 114 may be executed by processor 111 using portions of volatile memory 113.

FIG. 2 generally illustrates a loop between detection of touch inputs and output of graphical elements for touch-sensitive display 102. Beginning with the detection of touch inputs, during operation, capacitive touch sensor 106 of touch-sensitive display 102 is configured to continuously output their capacitances in the form of heat maps 132 (i.e., a matrix indicating relative sensor measurements at different locations (e.g., corresponding to capacitive grid)) to an associated touch handler 134 for touch-sensitive display 102. Touch handler 134 may optionally pass the heat maps 132 to a touch sensor calibration module 136 of a touch processing kernel 138, which performs on the fly, i.e., real-time, touch sensor calibration by applying calibration maps 140 to the heat maps 132, to thereby produce calibrated capacitance maps. The calibrated capacitance map optionally is passed to a blob detection module 142, which determines the areas of the capacitive touch sensor 106 that are touched. In some examples, blob detection module 142 receives calibrated capacitance map after ignoring, i.e., rejecting, areas such as palms or forearms, which are not deemed part of the user's intended touch. The blob detection module 142 may be configured to detect and distinguish between touch and hover inputs. To achieve this, the blob detection module 142 may be configured to apply a first predetermined touch capacitance difference threshold to the adjusted capacitance map to discern where the display is being touched, and a second predetermined hover capacitance difference threshold, which is lower than the first predetermined touch capacitance difference threshold, to detect hover of a user's digit. In a typical application, a centroid of each blob detected by the blob detection module 142 is passed to a touch input tracker 144.

The touch input tracker 144 is configured to track various touches over time using tracking algorithms that take into account the size, position, motion, and other general spatial features of each blob, and organize them into one or more touch inputs 146. On a multitouch display, for example, a first touch input 148 might be recognized as a series of contacts detected as a left index finger slides across the display and a second touch input 150 might be recognized as a series of contacts detected from a right index finger sliding across the display concurrently. A touch input typically begins with a digit down event when a blob is initially detected and ends with a digit up event when the tracked blob is detected as no longer being in contact.

Heat maps 132 include capacitance values for each touch-sensing pixel or capacitive grid point of each capacitive touch sensor matrix. Each heat map 132 may be provided to the operating system directly from capacitive touch sensor 106 (e.g., without firmware first distilling the raw touch data into touch points). Touch handler 134 may be configured to output heat map 132 based on capacitance measurements taken across capacitive touch sensor 106. The digitizer may represent the capacitance of each point of the touch sensor matrix with a binary number having a selected bit depth.

Depending on the touch-sensing capabilities of the computing system hardware, a touch controller of touch processing kernel 138 may receive one or more of the heat maps 132. The touch processing kernel 138 may be configured to communicate the heat map(s) 132 to other OS components and/or programs 130, process the raw heat map(s) 132 for downstream consumption, and/or log the heat map(s) 132 for subsequent use. The heat map(s) 132 received by touch processing kernel 138 provide a full complement of capacitance values measured by the capacitive sensors.

The heat map(s) 132 may include a capacitance value for each touch-sensing pixel or capacitive grid point of each capacitive touch sensor matrix of capacitive touch sensor 106. In some examples, capacitance values for the entirety of the capacitive touch sensor may be provided to touch processing kernel 138. In other examples, the included capacitance values may be thresholded, and capacitance values outside of such thresholds may be omitted from the heat map. The plurality of capacitance values representing detected touch input may collectively indicate a touch profile of touch input to the capacitive touch sensor.

Each heat map 132 thus presents a view of what is actually touching the display, rather than distilled individual touch points. The data for heat maps 132 may be provided to touch processing kernel 138 in a well-defined format; for example, the resolution, bit depth, data structure, and any compression may be consistently implemented so that touch processing kernel 138 is able to unambiguously interpret received heat maps 132. Heat maps 132 may thus provide an indication of how a user is holding computing device 100. Heat maps 132 may only be updated periodically, such as when there is a threshold change in one or more detected blobs, be it a change in size, location, and/or force.

A model may be trained based on large sets of heat map training data, wherein each pixel or other touch sensing location is labeled (e.g., via a human annotator) to indicate what is causing that touch measurement (e.g., right index finger, left index finger, right middle finger, palm, etc.). The trained model may then receive new heat maps during use and output a likelihood that each pixel is being touched by each different possible body part. Model training may occur via machine learning, neural networks, etc. but the present disclosure is compatible with other model training and retraining techniques, such as heuristics, metaheuristics, matheuristics, recursion, etc.

When presented with a heat map, such a model, or a separate model, may output a likelihood of a user hand posture, such as a grip or contact pattern based on previous training with the heat map training data. Herein, it may be stated that a heat map input into a model or decision "indicates" that a computing device is likely to be held in a specific grip or contact pattern. Such heuristics, previously-trained machine learning models, and/or other suitable techniques may be used to generate, evaluate, assess, or otherwise vet those indications.

Touch inputs 146 from the touch input tracker 144 and/or heat maps 132 may be passed to a program 130 executed by processor 111. The program 130 may be an application program, an operating system component, utility or driver program, etc. The program 130 contains program logic that processes the touch inputs 146 and generates appropriate graphical elements 150 for display. The graphical elements 150 are sent from the program 130 to a rendering pipeline 152 of the operating system of the computing device 100. The rendering pipeline 152 prepares the graphical elements for display on touch-sensitive display 102.

Computing device 100 may be configured to receive input from a digital stylus (not shown). Input received from the stylus through contact with or proximity to capacitive touch sensor 106 may be processed through touch handler 134. However, the stylus may have additional internal sensors, such as one or more IMUs, grip sensors, interactive buttons or regions, tip pressure sensors, etc. Data collected by such sensors may be communicated to computing device 100 via stylus handler 154, which may collect and process data received via wireless, capacitive, or other communicative modalities. The received data may inform characteristics of the stylus input and posture, which may in turn inform whether received touch input from either the stylus or the hand holding the stylus is intentional or unintentional. Stylus handler 154 may pre-process stylus-derived data and provide such pre-processed data to touch processing kernel 138.

Hand posture detector 156 may be trained, e.g., via supervised machine learning, to discern poses and postures of a user's hand relative to computing device 100 based on sensor data received from one or more sensors of sensor suite 115. As will be described in more detail with regards to FIGS. 4 and 5, hand posture detector 156 may receive features extracted from preprocessed sensor data and generate a likelihood that a recent touch input event was intentional or unintentional based on characteristics of input data as analyzed by the model previously trained with labeled training data. Hand posture detector 156 may provide such a likelihood, and/or bundled pose/posture data to touch processing kernel 138 in order that a touch input may be more accurately classified.

Touch rejection aggregator 158 may be the final arbiter as to whether a touch input should be arrested or passed on to programs 130. Touch rejection aggregator may receive a preliminary confidence rating for the intentionality of a touch input, data from stylus handler 154, confidence ratings and/or other data from hand posture detector 156, information about the user interface from programs 130, and/or other relevant data/information. As will be described in more detail with regard to FIGS. 4 and 5, touch rejection aggregator 158 may be trained, e.g., via supervised machine learning, to generate an aggregate confidence level for a touch input and compare that aggregate confidence level to a threshold to determine whether to arrest or pass on the touch input.

Figure 3:
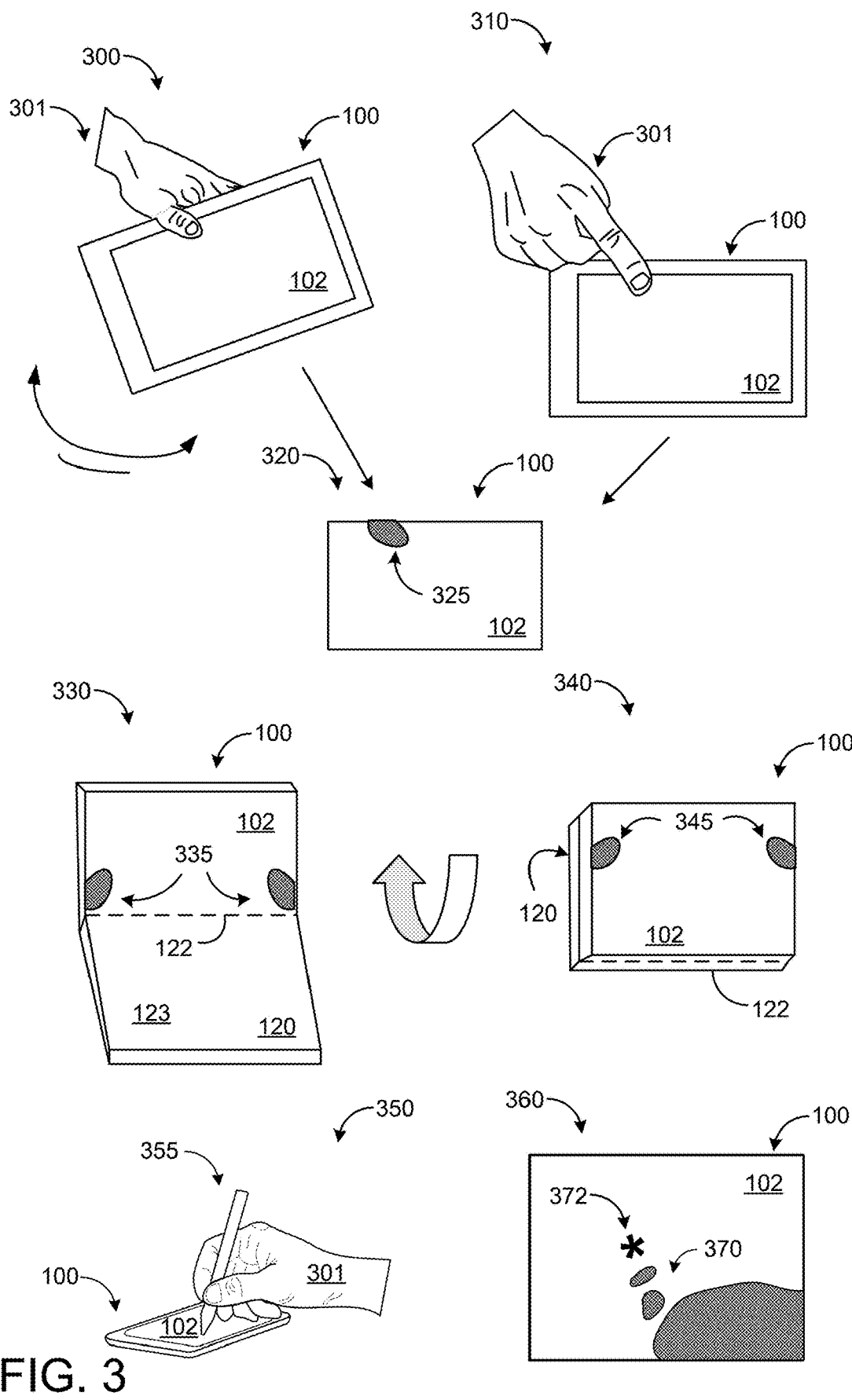
FIG. 3 illustrates example scenarios where a touch-sensitive display device may receive ambiguous touch input.

FIG. 3 depicts some examples of touch ambiguities that take place in daily use cases. At 300, a user 301 is depicted as carrying computing device 100 while moving (e.g., while walking), and gripping computing device 100 such that the user's thumb is contacting an edge of touch-sensitive display 102. At 310, user 301 is depicted as hold computing device 100 while not in motion, so that computing device 100 remains relatively static. User 301 touches touch-sensitive display 102 near the border with a portion of their hand. Whether that touch is intentional or not may not be readily discernible. Further, at 320, FIG. 3 shows a visual representation of a simplified heat map indicating a touch blob 325 that could be derived from either an unintentional or intentional touch input, as shown at 300 and 310.

Another common scenario has computing device 100 coupled to second leaf 120 via hinge 122. At 330, a user is holding computing device 100 so that their thumbs are contacting touch-sensitive display 102 on opposite sides, yielding touch blobs 335, shown overlaid on touch-sensitive display 102, which may be a valid, yet benign touch input. At 340 the user changes the posture of computing device 100 and folds second leaf 120 onto the back of touch-sensitive display 102 around hinge 122. In doing so, the user's thumbs contact touch-sensitive display 102 at different positions, yielding touch blobs 345, shown overlaid on touch-sensitive display 102.

Yet another common scenario is shown at 350, where user 301 is attempting to provide input to computing device 100 by pressing the tip of stylus 355 onto touch-sensitive display 102. However, the palm and fingers of user 301 are also in contact with touch-sensitive display 102. At 360, FIG. 3 shows a visual representation of a simplified heat map indicating a touch blob 370 that includes blobs corresponding to user 301's hands, as well as a contact point 372 for stylus 355. Palm rejection is performed to ensure that the stylus input is properly recognized. In other scenarios, a user may rest a portion of their hand on the touch-sensitive display while also providing touch input with their finger, potentially making it more difficult to discern intentional and unintentional touch points.

As such, based on the heat maps alone, many types of intentional and unintentional touch are indistinguishable. The computing device is generating and collecting significant amounts of sensor data which may be indicative of the true intention of the user. However, feeding all of this data into the touch processing kernel may be impractical, as training on vast data sets is time consuming both to perform and to generate valuable software and/or firmware updates.

FIG. 4 shows a computer-implemented method 400 for processing touch input at a touch-sensitive device, such as computing device 100, according to an embodiment of the present disclosure. Method 400 may be performed at one or more processes of the touch-sensitive display device, as an example. Additionally or alternatively, aspects of method 400 may be performed by one or more computing devices communicatively coupled to the touch-sensitive display device. While primarily described in the context of a device having a single touch display, method 400 is additionally or alternatively applicable to multi-screen devices where at least one display is a touch display and one or more connected leaves is not a touch display, to multi-screen devices where both displays are touch displays, and also to multi-leaved devices where at least one leave is neither a display nor touch-sensitive, such as a detachable keyboard.

At 410, method 400 includes recognizing a touch input to the touch-sensitive display device. the recognized touch input may be from a body part, a stylus, or other object the device is capable of sensing or from which information regarding touch input may be received. As described with regard to FIG. 2, the touch input may be recognized by a touch handler which may be configured to output a heat map based on capacitance measurements taken across capacitive touch sensor.

Figure 5:
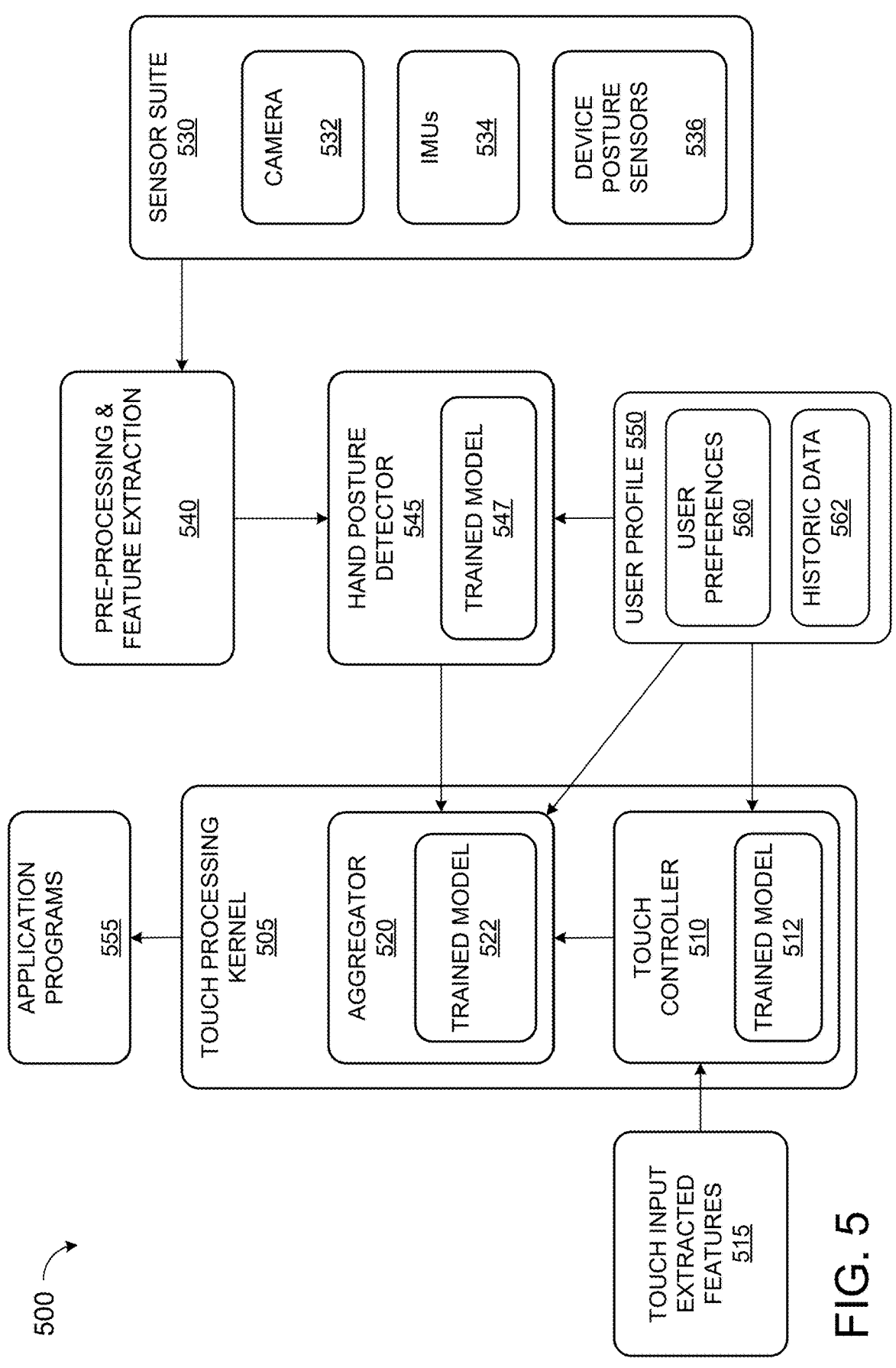
FIG. 5 schematically shows an example system for processing input received at a touch-sensitive display device.

At 420, method 400 includes, based at least on a first set of features extracted from the recognized touch input, determining a first likelihood that the recognized touch input is unintentional. Turning to FIG. 5, a system 500 for processing input at a touch-sensitive display device is schematically shown. System 500 may be an example of computing device 100. System 500 includes a touch processing kernel 505. Touch processing kernel 505 may be an example of touch processing kernel 138. Touch processing kernel 505 includes a touch controller 510 which may operate one or more trained models 512, for example, a machine learning model trained to determine a likelihood of unintentional touch input based on touch input extracted features 515. Trained model 512 may be previously trained through supervised training based on labeled scenarios of unintended and intended touch. Decision boundaries may be generated by the different scenarios utilized during training of trained model 512, whereby the distance from a decision boundary inversely correlates with confidence.

Touch input extracted features may be extracted from heat maps generated from the recognized touch input. For example, a blob detection module, such as blob detection module 142 may output one or more blob centroids, blob areas, blob dimensions in the X and Y directions, blob compactness, blob elongation, blob halo, blob standard deviations, blob entropy, blob peak ratios, blob motion over time, blob position on the touch-sensitive display size, a force at the blob centroid, etc. The processing of such touch blobs may be done in one block of the system architecture, e.g., at one processor or one core. The touch controller may be independently programmed at the firmware level and may be configured to provide at least default outputs of an unintended touch confidence and the first set of features extracted from the touch heat map, for example to aggregator 520. Aggregator 520 may be an example of rejection aggregator 158 and may include at least a trained model 522. Trained model 522 may be previously trained through supervised training based on labeled scenarios of unintended and intended touch. Decision boundaries may be generated by the different scenarios utilized during training of trained model 522, whereby the distance from a decision boundary inversely correlates with confidence. Aggregator 520 may be programmed at the software level of touch processing kernel 505.

In examples where the touch input is received from a stylus, the stylus may be communicatively coupled to the touch-sensitive display device. Determining the first likelihood may further be based on at least data received from the stylus.

Returning to FIG. 4, at 420, method 400 further includes comparing the first likelihood that the recognized touch input is unintentional to a first confidence threshold. The first confidence threshold may be predetermined or may be based on current operating conditions. At 425, method 400 considers scenarios where the touch controller determines that the first likelihood is less than the first confidence threshold. Responsive to the first likelihood being less than the first confidence threshold, at 430, method 400 includes determining a second likelihood that the recognized touch input is unintentional, the second likelihood based on at least a second set of features extracted from outputs of one or more additional sensors. Alternatively, responsive to the first likelihood of unintentional touch being greater than the first confidence threshold, method 400 includes arresting the touch input. For example, the touch input may be blocked, reverted, and/or held in abeyance for additional information. In this way, if the touch input is clearly unintended relative to the first confidence threshold, the touch input can be ignored. However, some aspects and characteristics of the recognized touch input may be stored in a cache or touch history in order to inform future touch input discernment. Further, the likelihood of unintentional touch may influence how recent touch inputs are processed (e.g., retroactively). For example, an indication of touch that was previously reported and is still being tracked and processed at higher layers (e.g., the OS or gesture tracking mechanism) may be reverted if characteristics of the more recent touch input strongly suggest that a previous touch input was indeed unintentional.

Returning to FIG. 5, system 500 includes a sensor suite 530. Sensor suite 530 may be an example of sensor suite 115. In this example, sensor suite 530 is shown to include at least camera 532, IMUs 534, and device posture sensors 536, though other sensors may be included as described further herein as well as with respect to FIG. 2. The data output by the sensors in sensor suite 530 may be processed with one or more processes, generally, but not necessarily, different processes than the processes used to process touch input. Rather, data from sensor suite 530 may be processed with several side processes. Such processes may receive data from sensor suite 530 for pre-processing and feature extraction 540. Data from each sensor may thus be pre-processed prior to being received by the hand posture detector 545. Hand posture detector 545 may then receive classifiable features, such as a user posture relative to the touch-sensitive display device, rather than a series of raw camera images, for example. Each sensor may employ one or more dedicated pre-processes or may collectively employ one or more pre-processes. Signal processing, such as smoothing, may be performed on the raw inputs from the IMUs 534 and device posture sensors 536. In some implementations the different processes may be executed by completely different processors (e.g., firmware for touch controller 510 and/or aggregator 520, and CPU for hand posture detector 545).

Extracted features may then be passed to hand posture detector 545. Hand posture detector 545 may be an example of hand posture detector 156 and may include at least a trained model 547. Hand posture detector 545 may receive extracted features from pre-processing and feature extraction 540 and use trained model 547 for evaluation. For example, hand posture detector may evaluate input data to determine if and how the user is gripping the device, if the user's palm or other hand or body part is contacting the device, if the user is in motion and carrying the device, etc. Trained model 547 may be previously trained through supervised training based on labeled scenarios of unintended and intended touch. Trained model 547 may be trained based on a full menu of possible inputs and/or sub-sets of inputs with other inputs masked, thus allowing the aggregator to dynamically adapt to the inputs that are available at runtime after training. Decision boundaries may be generated by the different scenarios utilized during training of trained model 547, whereby the distance from a decision boundary inversely correlates with confidence. Hand posture detector 545 may output at least a confidence level of an unintended touch to aggregator 520 based on this evaluation.

In some examples, trained model 547 may include optical flow estimation to discern per-pixel and/or sub-pixel movement. Additionally or alternatively, trained model 547 may include a set of one or more trained machine learning classifiers that are configured to recognize unintentional touch input by generating a classification and confidence to the features generated by from pre-processing and feature extraction 540. Trained model 547 may be trained on a collection of labeled intended and unintended touch scenarios, with informative features derived from those scenarios and labeled, via supervised training, for example. The model algorithms herein may be trained and retrained via machine learning to determine how a particular user prefers to provide touch input to the touch-sensitive display device and what the user expectation is in each particular scenario.

Pre-processing and feature extraction 540 extracts features from the sensor suite data, and from those features, the correlations between the features and intended and unintended touch scenarios are calculated. The correlations may then be used to generate one or more confidence and/or likelihood scores. For example, decision boundaries between scenarios may be indicated, and a confidence generated based on a distance of the output of the machine learning models and a decision boundary. For example, a classification that is a threshold distance from a decision boundary will be assigned a high confidence, while a classification that is near a decision boundary will be assigned a lower confidence.

Camera 532 may be an RGB or IR camera, and may be operated in an always-on mode, capturing low-resolution and low-frame rate data. Presence of a user may be first be determined by identifying human body parts using a machine learning model trained with corresponding low-resolution and/or low-frame rate data. Once the body parts are discerned, the images may be classified according to a previously-trained machine learning model. As an example, the images may be assigned to a cluster, which may include a previously determined potential option, and which may thus have values that are discrete from other clusters, rather than operating on a continuum. Clusters may be indicative of valid range working scenarios, non-relevant postures, and other possible options.

From the identified body parts, posture and other information about the user may be extracted, either relative to or independent from the touch-sensitive display device. In some examples, the extracted features may include a distance between the user and the device, and/or a relative orientation or posture of user and device as recognized by a machine learning model from one or more image frames output by the camera. For cases where the device is relatively static, the relative orientation may be determined with high confidence. For example, a scenario wherein the user is holding the device while the screen is perpendicular to the floor and the user palm is holding the edge of the device.

If it can be determined that the user is carrying the device in a posture that does not correspond to everyday usage, the probability that an intentional input is received is lower than for a scenario where the device is being held in an ergonomically favorable position for providing touch input.

Although camera 532 may be operated in a low-resolution mode, the features of the user's face may be analyzed to generally discern whether the user is looking towards or away from the device. Relative positioning of ears, nose, mouth, and other machine-learning-identifiable facial features may provide a general gaze direction, even if the imagery is not sufficient to perform eye-tracking and/or pupil tracking functions. However, if the camera is operating at a higher resolution mode, these features may also be extracted and used to inform the gaze direction of the user, using any suitable eye-tracking methodology.

If all or part of the hand of the user is visible on the camera, the hand size and/or palm size of the user may be extracted. This can inform the likelihood of unintentional touch, as one of the more common unintended touches is when a user is placing their palm prior to providing touch input with a finger or stylus. This is traditionally performed based on static parameters used to inform an algorithm that fits a majority of the population. For a known user, these features may be stored in a user profile 550, for example, so that these calculations need not be repeated for every touch input. In this way, users with large palms and/or fingers can be supported without generating false positives amid valid touches for people with smaller hands.

Using adaptive parameters based on camera-generated data, such parameters can be modified according to the user, and generate high confidence decisions on whether touch is intentional or unintentional in specific, identifiable scenarios. For example, image data from camera 532 may allow for the detection of deliberate movement of the user's hand and/or finger towards the touch-sensitive display as recognized by a machine learning model from one or more image frames output by the camera. For a user deploying a stylus, the camera data may reinforce or disambiguate estimated movement of the stylus based on internal stylus sensors and/or communication between the stylus and the touch-sensitive display device.

The movement and orientation information derived from IMUs 534 may inform which device scenarios to consider when determining whether touch input is intentional or unintentional. However, such sensors may have some environmental sensitivity to specific hardware setups, magnets, metals, etc. that could generate a signal with an unfavorable signal to noise ratio. As such, the signals from IMUs 534 may be weighted less than from other sensors in some scenarios, or may benefit from confirmation based on data from other sensors, such as the camera, for example.

Accelerometers and/or gyroscopes of IMUs 534 may be configured to detect vibrations within the touch-sensitive display device. Vibration-based signals may be used to detect indication of touch from either side of the device, the touch-sensitive display side or the obverse side. Patterns of touch from both sides of the device may inform unintended touch classification. For example, if the user is alternately tapping the device sides, the touch to the touch-sensitive side may not be indicative of intentional input. Further, vibration-based signals may indicate how the device is being held, and thus how vibrations are being dampened. If the device is being carried under the arm of the user, the portions of the device being pressed between arm and ribcage will display different vibration patterns than the residual portions. As such, the hand posture detector may be able to discern intentional touch with gripping or holding of the device based on the device vibration characteristics and other sensory inputs. Data received from IMUs 534 may inform how the touch-sensitive display device is oriented relative to the environment, the user, and to itself, as recognized by a machine learning model from data output by the inertial measurement unit.

As described with regard to FIG. 2, device posture sensors 536 may include hall effect sensors, proximity sensors, hinge angle sensors, status of detachable companion device sensors, wireless signal level sensors, etc. Data received from device posture sensors 536 may inform how the touch-sensitive display device is oriented relative to itself, such as one of a plurality of changeable configurations of the touch-sensitive display device as recognized by a machine learning model from data output by the one or more device posture sensors 536. As an example, if a second leaf is attached to the touch-sensitive display device, as shown in FIG. 1B, device posture sensors 536 may be used to determine the posture of the two leaves relative to each other (e.g., tented posture, flat posture, book posture). The technical benefits obtained by employing device posture sensors 536 in this way may include generating an internal set of device postures that may be compared to the use history of the device for a particular user. By inferring how parts of the device are oriented relative to each other, the user history may be accessed to determine what types of input the user is likely to provide with intention.

Wireless signal level sensors may include sensors for Wi-Fi, long-term evolution, short-range wireless, cellular data, etc. Such signal level sensors may indicate contact points on the touch-sensitive display device. For example, if a user is blocking an antenna by holding the device in a certain location, but not blocking other antennas. Such data may be analyzed over time, in addition to or instead of at any given moment.

In some examples, the sensor suite may include sensors located external to the device or stylus. For examples, the user may have one or more of a watch, phone, desktop computer, television, etc. that are communicatively connected to the touch-sensitive input device. Cameras and/or microphones, IMUs, etc. associated with these devices and/ or other free-standing auxilliary sensors may provide data that augment the data from internal sensors. Such data may help further classify the user's pose and posture relative to the touch-sensitive input device. Further, data from the user interface (UI) of one or more devices may provide additional information about the user's activities and where the user's attention may be directed. For example, it may be unlikely that the user is providing touch input to mulitple devices at the same time; an indication that the user is physically interacting with a watch thus decreases the likelihood of the user providing a valid touch input to the touch-sensitive input device.

Data sets from sensor suite 530 may include a plurality of data frames preceding and including data frames including the recognized touch input. The number of frames may be predetermined, or may be based on operating conditions, such as a timing of a last valid or unintentional touch input. In some examples, hand posture detector 545 may receive some information from touch controller 510, e.g., first likelihood and/or blob characteristics. Such data could narrow down which possible scenarios on which to run inference.

In some examples, sets of intended touch and unintended touch scenarios are grouped together, so that the hand posture detector outputs a single likelihood of unintended (or intended) touch, or a simple likelihood ratio—e.g., the user is engaged/not engaged. In other examples, the hand posture detector may output likelihoods for two or more scenarios—e.g., the user is walking and holding the touch-sensitive display device at their hip vs. the user walking and holding the touch-sensitive display device where the display is visible. Hand posture detector 545 may thus output a matrix of likelihoods for particular postures or posture clusters. In some examples, the hand posture detector may output some or all of the second set of features for use by aggregator 520 or other aspects of the touch-sensitive display device. By maintaining hand posture detector 545 and touch controller 510 separate, the output of hand posture detector 545 need not impact the output of touch controller 510.

Returning to FIG. 4, at 440, method 400 includes determining an aggregate likelihood that the recognized touch input is unintentional based on at least the first likelihood, the first set of features, and the second likelihood. Once hand posture detector 545 has determined a second likelihood of unintended touch, that second likelihood is passed to aggregator 520, which then considers extracted features 515 in view of the likelihood and the second likelihood.

Similar to the evaluation by hand posture detector 545, aggregator 520 may include trained model 522, which may be previously trained through supervised training based on labeled scenarios of unintended and intended touch. Decision boundaries may be generated by the different scenarios utilized during training of the aggregator, whereby the distance from a decision boundary inversely correlates with confidence.

Aggregator 520 may be part of the touch middleware portion of touch processing kernel 505. Aggregator 520 thus has access to some features that were extracted from the initial heat map, such as blob size, elongation, compactness, halo, centroid, standard deviation, entropy, peaks ratio, etc. If there is some ambiguity and the confidence is low, some additional processing may be applied to the extracted features 515.

Aggregator 520 may consider stylus information, user interface information, and/or information from user profile 550 in generating an aggregate confidence. In examples where hand posture detector 545 provides additional bundles of sensor data features or likely scenarios—e.g., likely poses, postures, etc., aggregator 520 may consider that data, and use that data to reduce the number of scenarios considered, for example. Aggregator 520 may be trained based on a full menu of possible inputs and/or sub-sets of inputs with other inputs masked, thus allowing the aggregator to dynamically adapt to the inputs that are available at runtime after training.

Returning to FIG. 4, at 440, method 400 further includes comparing the aggregate likelihood that the recognized touch input is unintentional to a second confidence threshold. The second confidence threshold may be static or context dependent. At 450, method 400 includes, responsive to the aggregate likelihood being greater than the second confidence threshold, arresting the touch input. Alternatively, responsive to the aggregate likelihood being less than the second confidence threshold, method 400 includes reporting the touch input to one or more application programs 555. While the touch controller is generally only evaluating the features extracted from the heat map, if a touch is determined to be intentional, the full heat map may be passed to application programs 555. This allows for more robust analysis of unintended touch confidence at the initial level, while still providing all of the input data when it may be useful (e.g., for advanced touch processing by the application program 555). If the initial set of extracted features 515 are not sent to application programs 555 for refinement into detailed feature extraction, they may be discarded. In some examples, some features may be maintained in a cache for subsequent input analysis. For example, if the same input repeated, it may be compared to previous input to determine whether the repeats are deliberate (e.g., increasing force, slight change in blob) or the result of repetitive tapping (e.g., similar force, similar blob center). Such a determination may be future facing (e.g., applied to the current or future touch inputs) or retroactive (e.g., as part of a soft decision mechanism) such that previous touch detections can be cancelled or adjusted after the initial detection if the tracking is ongoing at higher processing layers.

As described, one or more of touch controller 510, hand posture detector 545, and aggregator 520 may consider user profile 550. User profile 550 includes user preferences 560 and historic data 562. User preferences 560 may include device preferences, application preferences, handedness models, etc. Historic data 562 may, for example, include context aware heat maps that indicate corresponding usage tendencies, for example, which app was being used, what the device posture was when the heat map was recorded, etc. In this way, a newly received heat map may be compared to stored heat maps from similar postures and use scenarios.

The methods described herein can be designed to be flexible and support the existing device sensors in a modular and/or additive fashion. The confidence output by the aggregator tracks with the number of sensors available within the specific device and/or producing useable information in a specific scenario. Such modular implementation allows for a wide range of deployment scenarios across device types and original equipment manufacturer ecosystems.

The hand posture detector can be trained separately from other components of the touch controller, and can thus be improved and updated without having to change any of the components upstream of it in the touch processing kernel.

In such a two-stage approach, the first stage can be performed without having to make any changes to the firmware level analysis or even to the touch controller software layer analysis. Anytime that first stage is updated, the two-stage approach automatically benefits. Adding a second stage which operates somewhat independently of the first stage, provides an extra analysis layer that can further improve the system. As such, more cases can be covered than with existing solutions and touch rejection mechanisms can be rendered to have improved reliability.

The technical results of implementing the disclosed methods allows for a reduced burden of user input to a computing device and for improved human-computer interactions.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
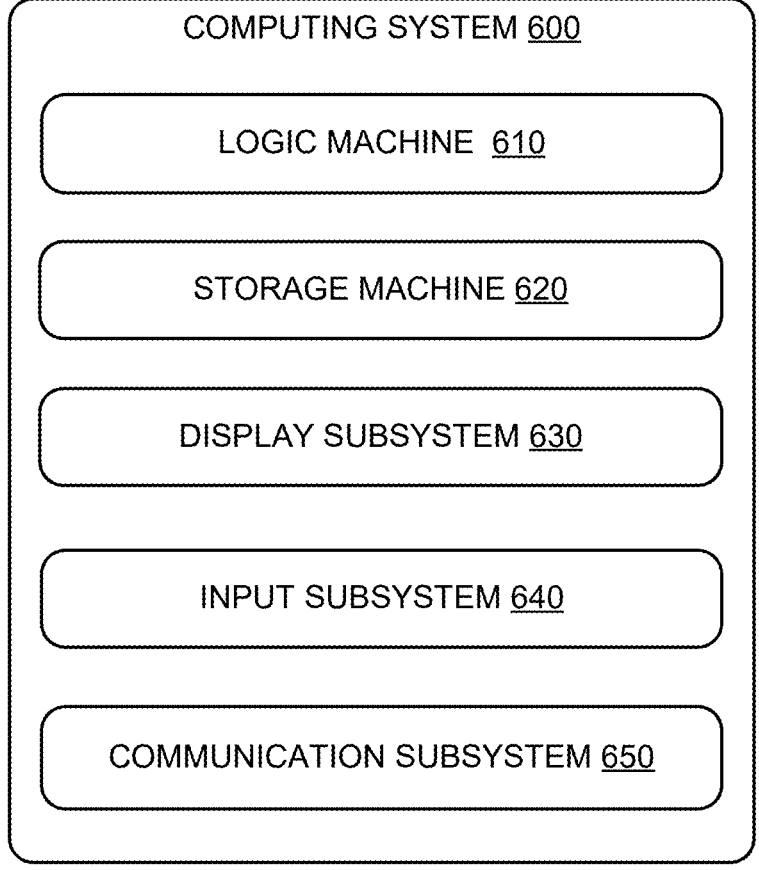
FIG. 6 schematically shows an example computing device.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a storage machine 620. Computing system 600 may optionally include a display subsystem 630, input subsystem 640, communication subsystem 650, and/or other components not shown in FIG. 6. For example, computing devices 100 and 500 may be examples of computing system 600. Processor 111 may be an example of logic machine 610. Volatile memory 113 and non-volatile memory 114 may be examples of storage machine 620. Touch-sensitive display 102 may be an example of display subsystem 630. Capacitive touch sensor 106 may be an example of input subsystem 640. Stylus handler 154 may be an example of communication subsystem 650.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 620 includes one or more physical devices configured to hold instructions executable by the logic machine to implement the methods and processes described herein. When such methods and processes are implemented, the state of storage machine 620 may be transformed—e.g., to hold different data.

Storage machine 620 may include removable and/or built-in devices. Storage machine 620 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 620 may include volatile, nonvolatile, dynamic, static, read/write, read-only, random-access, sequential-access, location-addressable, file-addressable, and/or content-addressable devices.

It will be appreciated that storage machine 620 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 620 may be integrated together into one or more hardware-logic components. Such hardware-logic components may include field-programmable gate arrays (FPGAs), program-and application-specific integrated circuits (PASIC/ASICs), program-and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 620. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

Machine learning models as referenced above may be implemented using any suitable combination of state-of-the-art and/or future machine learning (ML) and/or other artificial intelligence (AI) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 630 may be used to present a visual representation of data held by storage machine 620. This visual representation may take the form of a graphical user interface (GUI). As the herein described methods and processes change the data held by the storage machine, and thus transform the state of the storage machine, the state of display subsystem 630 may likewise be transformed to visually represent changes in the underlying data. Display subsystem 630 may include one or more display devices utilizing virtually any type of technology. Such display devices may be combined with logic machine 610 and/or storage machine 620 in a shared enclosure, or such display devices may be peripheral display devices.

When included, input subsystem 640 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on-or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 650 may be configured to communicatively couple computing system 600 with one or more other computing devices. Communication subsystem 650 may include wired and/or wireless communication devices compatible with one or more different communication protocols. As non-limiting examples, the communication subsystem may be configured for communication via a wireless telephone network, or a wired or wireless local-or wide-area network. In some embodiments, the communication subsystem may allow computing system 600 to send and/or receive messages to and/or from other devices via a network such as the Internet.

In one example, a method for processing input at a touch-sensitive display device comprises recognizing a touch input to the touch-sensitive display device; based at least on a first set of features extracted from the recognized touch input, determining a first likelihood that the recognized touch input is unintentional; compare the first likelihood that the recognized touch input is unintentional to a first confidence threshold; responsive to the first likelihood being less than the first confidence threshold, determining a second likelihood that the recognized touch input is unintentional, the second likelihood based on at least a second set of features extracted from outputs of one or more additional sensors; and determining an aggregate likelihood that the recognized touch input is unintentional based on at least the first likelihood, the first set of features, and the second likelihood; compare the aggregate likelihood to a second confidence threshold; and responsive to the aggregate likelihood being greater than the second confidence threshold, arresting the touch input. In such an example, or any other example, the method additionally or alternatively comprises, responsive to the first likelihood being greater than the first confidence threshold, arresting the touch input. In any of the preceding examples, or any other example, the method additionally or alternatively comprises, responsive to the aggregate likelihood being less than the second confidence threshold, reporting the touch input to one or more application programs. In any of the preceding examples, or any other example, the recognized touch input is additionally or alternatively from a body part. In any of the preceding examples, or any other example, the recognized touch input is additionally or alternatively from a stylus. In any of the preceding examples, or any other example, the stylus is additionally or alternatively communicatively coupled to the touch-sensitive display device, and wherein determining the first likelihood is further based on at least data received from the stylus. In any of the preceding examples, or any other example, the one or more additional sensors additionally or alternatively comprise a camera. In any of the preceding examples, or any other example, the camera is additionally or alternatively operated in an always-on mode, at one or more of a reduced resolution and a reduced frame rate relative to an active mode. In any of the preceding examples, or any other example, the second set of features additionally or alternatively include a posture of a user relative to the touch-sensitive display device as recognized by a machine learning model from one or more image frames output by the camera. In any of the preceding examples, or any other example, the second set of features additionally or alternatively include movement of a hand of a user prior to the recognition of the touch-input as recognized by a machine learning model from one or more image frames output by the camera. In any of the preceding examples, or any other example, the one or more additional sensors additionally or alternatively comprise an inertial measurement unit. In any of the preceding examples, or any other example, the second set of features additionally or alternatively comprise a pose of the touch-sensitive display device relative to an environment as recognized by a machine learning model from data output by the inertial measurement unit. In any of the preceding examples, or any other example, the one or more additional sensors additionally or alternatively include one or more device posture sensors. In any of the preceding examples, or any other example, the second set of features additionally or alternatively include one of a plurality of changeable configurations of the touch-sensitive display device as recognized by a machine learning model from data output by the one or more device posture sensors. The technical effect of implementing such a method is an improvement in human-computer interactions.

In another example, a system for a touch-sensitive display device, comprises a capacitive touch sensor configured to receive touch input and to output characteristics of the touch input; a touch controller configured to: extract a first set of features from a recognized touch input; based at least on the first set of features extracted from the recognized touch input, determine a first likelihood that the recognized touch input is unintentional; and compare the first likelihood that the recognized touch input is unintentional to a first confidence threshold; a sensor suite comprising one or more additional sensors; a hand posture detector configured to: receive a second set of features extracted from outputs of the one or more additional sensors; responsive to the first likelihood being less than the first confidence threshold, determine a second likelihood that the recognized touch input is unintentional, the second likelihood based on at least on the second set of features extracted from the outputs of the one or more additional sensors; and an aggregator configured to: receive the first set of features and the first likelihood from the touch controller; receive the second set of features from the hand posture detector; based on at least the first likelihood, the first set of features, and the second likelihood, determine an aggregate likelihood that the recognized touch input is unintentional; compare the aggregate likelihood that the recognized touch input is unintentional to a second confidence threshold; and responsive to the aggregate likelihood being greater than a second confidence threshold, arrest the touch input. In such an example, or any other example, the hand posture detector additionally or alternatively includes a set of machine learning classifiers trained to recognize unintentional touch input. In any of the preceding examples, or any other example, the aggregator and touch controller are additionally or alternatively executed by a same process of the touch-sensitive display device. In any of the preceding examples, or any other example, the touch controller is additionally or alternatively executed in firmware of the touch-sensitive display device. In any of the preceding examples, or any other example, the hand posture detector is additionally or alternatively executed by one or more additional processes of the touch-sensitive display device. The technical effect of implementing such a system is a reduced burden of user input to a computing device.

In yet another example, a system for a touch-sensitive display device comprises a capacitive touch sensor configured to receive touch input and to output characteristics of the touch input; a touch controller executed by one or more processes located within a touch processing kernel, the touch controller configured to: extract a first set of features from a recognized touch input; based at least on the first set of features extracted from the recognized touch input, determine a first likelihood that the recognized touch input is unintentional; and compare the first likelihood that the recognized touch input is unintentional to a first confidence threshold; a sensor suite comprising one or more additional sensors; a hand posture detector executed by one or more processes located outside of the touch processing kernel, the hand posture detector configured to receive a second set of features extracted from outputs of the one or more additional sensors via one or more side processes; and responsive to the first likelihood being less than the first confidence threshold, determine a second likelihood that the recognized touch input is unintentional, the second likelihood based on at least the second set of features extracted from the outputs of the one or more additional sensors; and an aggregator executed by one or more processes located within the touch processing kernel, the aggregator configured to: receive the first set of features and the first likelihood from the touch controller; receive the second set of features from the hand posture detector; based on at least the first likelihood, the first set of features, and the second likelihood, determine an aggregate likelihood that the recognized touch input is unintentional; compare the aggregate likelihood that the recognized touch input is unintentional to a second confidence threshold; and responsive to the aggregate likelihood being greater than the second confidence threshold, arrest the touch input. The technical effect of implementing such a system is an improvement in human-computer interactions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for processing input at a touch-sensitive display device, comprising:

recognizing a touch input to the touch-sensitive display device based on data received from one or more touch sensors;

performing a first stage of analysis, comprising:

based at least on a first set of features extracted from the recognized touch input, determining a first likelihood that the recognized touch input is unintentional;

comparing the first likelihood that the recognized touch input is unintentional to a first confidence threshold;

responsive to the first likelihood being greater than the first confidence threshold, arresting the touch input;

responsive to the first likelihood being less than the first confidence threshold, performing a second stage of analysis, comprising:

determining a second likelihood that the recognized touch input is unintentional, the second likelihood based on at least a second set of features extracted from outputs of one or more additional sensors, other than the one or more touch sensors;

determining an aggregate likelihood that the recognized touch input is unintentional based on at least the first likelihood, the first set of features, and the second likelihood; and comparing the aggregate likelihood to a second confidence threshold; and responsive to the aggregate likelihood being greater than the second confidence threshold, arresting the touch input.

2. The method of claim 1, further comprising:

responsive to the aggregate likelihood being less than the second confidence threshold, reporting the touch input to one or more application programs.

3. The method of claim 1, wherein the recognized touch input is from a body part.

4. The method of claim 1, wherein the recognized touch input is from a stylus.

5. The method of claim 4, wherein the stylus is communicatively coupled to the touch-sensitive display device, and wherein determining the first likelihood is further based on at least data received from the stylus.

6. The method of claim 1, wherein the one or more additional sensors comprise a camera.

7. The method of claim 6, wherein the camera is operated in an always-on mode, at one or more of a reduced resolution and a reduced frame rate relative to an active mode.

8. The method of claim 6, wherein the second set of features include a posture of a user relative to the touch-sensitive display device as recognized by a machine learning model from one or more image frames output by the camera.

9. The method of claim 6, wherein the second set of features include movement of a hand of a user prior to the recognition of the touch-input as recognized by a machine learning model from one or more image frames output by the camera.

10. The method of claim 1, wherein the one or more additional sensors comprise an inertial measurement unit.

11. The method of claim 10, wherein the second set of features comprise a pose of the touch-sensitive display device relative to an environment as recognized by a machine learning model from data output by the inertial measurement unit.

12. The method of claim 1, wherein the one or more additional sensors include one or more device posture sensors.

13. The method of claim 12, wherein the second set of features include one of a plurality of changeable configurations of the touch-sensitive display device as recognized by a machine learning model from data output by the one or more device posture sensors.

14. A system for a touch-sensitive display device, comprising:

a capacitive touch sensor configured to receive touch input and to output characteristics of the touch input;

a touch controller configured to:

extract a first set of features from a recognized touch input;

perform a first stage of analysis, comprising:

based at least on the first set of features extracted from the recognized touch input, determine a first likelihood that the recognized touch input is unintentional;

compare the first likelihood that the recognized touch input is unintentional to a first confidence threshold; and responsive to the first likelihood being greater than the first confidence threshold, arrest the touch input;

a sensor suite comprising one or more additional sensors, other than the capacitive touch sensor;

a hand posture detector executed by one or more processors, the hand posture detector configured to:

receive a second set of features extracted from outputs of the one or more additional sensors;

responsive to the first likelihood being less than the first confidence threshold, initiate a second stage of analysis, including determining a second likelihood that the recognized touch input is unintentional, the second likelihood based on at least on the second set of features extracted from the outputs of the one or more additional sensors; and an aggregator executed by one or more processors, the aggregator configured to, as part of the second stage of analysis:

receive the first set of features and the first likelihood from the touch controller;

receive the second set of features from the hand posture detector;

based on at least the first likelihood, the first set of features, and the second likelihood, determine an aggregate likelihood that the recognized touch input is unintentional;

compare the aggregate likelihood that the recognized touch input is unintentional to a second confidence threshold; and responsive to the aggregate likelihood being greater than a second confidence threshold, arrest the touch input.

15. The system of claim 14, wherein the hand posture detector includes a set of machine learning classifiers trained to recognize unintentional touch input.

16. The system of claim 14, wherein the aggregator and touch controller are executed by a same process processor of the touch-sensitive display device.

17. The system of claim 14, wherein the touch controller is executed in firmware of the touch-sensitive display device.

18. The system of claim 17, wherein the hand posture detector is executed by one or more additional processors, other than the firmware of the touch-sensitive display device.

19. A system for a touch-sensitive display device, comprising:

a capacitive touch sensor configured to receive touch input and to output characteristics of the touch input;

a touch controller executed by one or more processesprocessors located within a touch processing kernel, the touch controller configured to:

extract a first set of features from a recognized touch input;

perform a first stage of analysis, comprising:

based at least on the first set of features extracted from the recognized touch input, determine a first likelihood that the recognized touch input is unintentional; and compare the first likelihood that the recognized touch input is unintentional to a first confidence threshold;

a sensor suite comprising one or more additional sensors other than the capacitive touch sensor;

a hand posture detector executed by one or more processors located outside of the touch processing kernel, the hand posture detector configured to:

receive a second set of features extracted from outputs of the one or more additional sensors via one or more side processes; and

24 responsive to the first likelihood being less than the first confidence threshold, initiate a second stage of analysis, including determining a second likelihood that the recognized touch input is unintentional, the second likelihood based on at least the second set of features extracted from the outputs of the one or more additional sensors; and an aggregator executed by one or more processors located within the touch processing kernel, the aggregator configured to, as part of the second stage of analysis:

receive the first set of features and the first likelihood from the touch controller;

receive the second set of features from the hand posture detector;

based on at least the first likelihood, the first set of features, and the second likelihood, determine an aggregate likelihood that the recognized touch input is unintentional;

compare the aggregate likelihood that the recognized touch input is unintentional to a second confidence threshold; and responsive to the aggregate likelihood being greater than the second confidence threshold, arrest the touch input.

20. The system of claim 19, wherein the touch controller is further configured to, responsive to the first likelihood being greater than the first confidence threshold, arrest the touch input.

* * * * *